Oct. 27, 1931.  F. O. PHAGANS  1,829,295

DEVICE FOR TEACHING ARITHMETIC

Filed Aug. 27, 1929  3 Sheets-Sheet 1

Inventor

F. O. Phagans

By *Clarence A O'Brien*
Attorney

Oct. 27, 1931.  F. O. PHAGANS  1,829,295
DEVICE FOR TEACHING ARITHMETIC
Filed Aug. 27, 1929   3 Sheets-Sheet 2
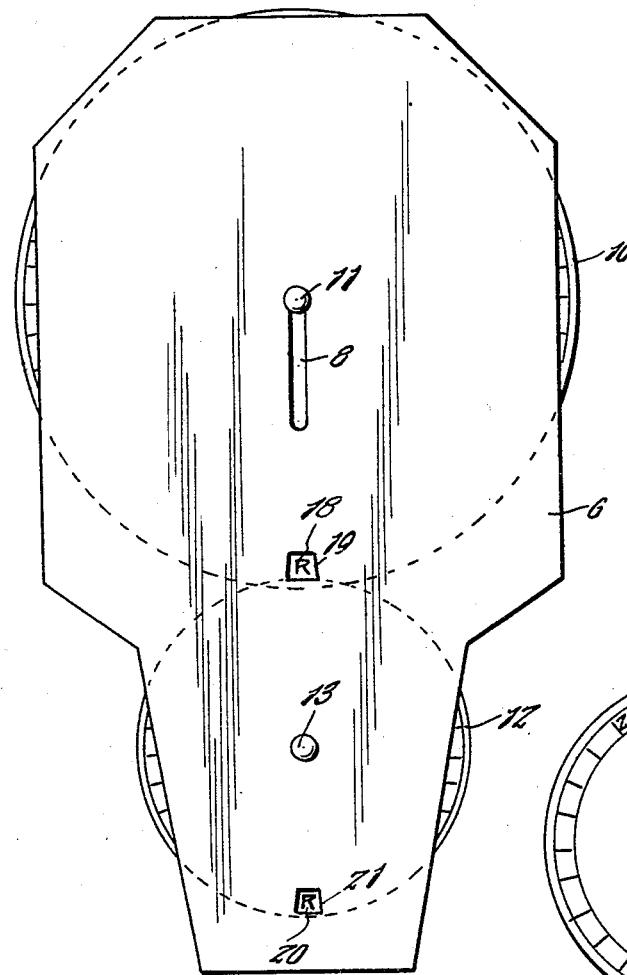
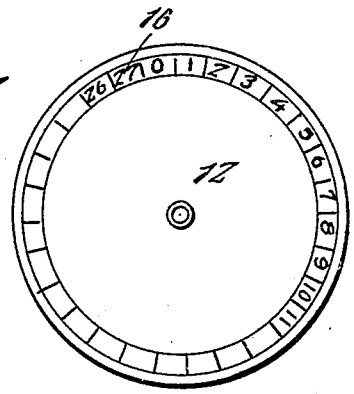
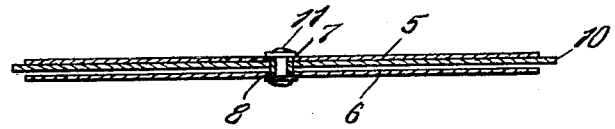
Inventor
F. O. Phagans
By Clarence A. O'Brien
Attorney Oct. 27, 1931.  F. O. PHAGANS  1,829,295
DEVICE FOR TEACHING ARITHMETIC
Filed Aug. 27, 1929  3 Sheets-Sheet 3
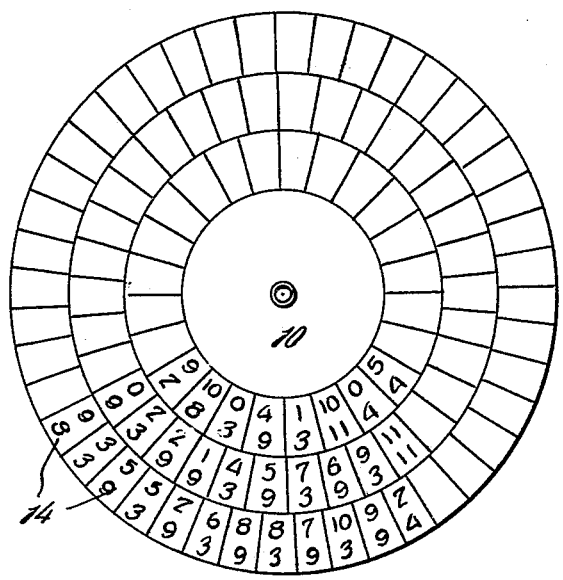
Fig. 6.
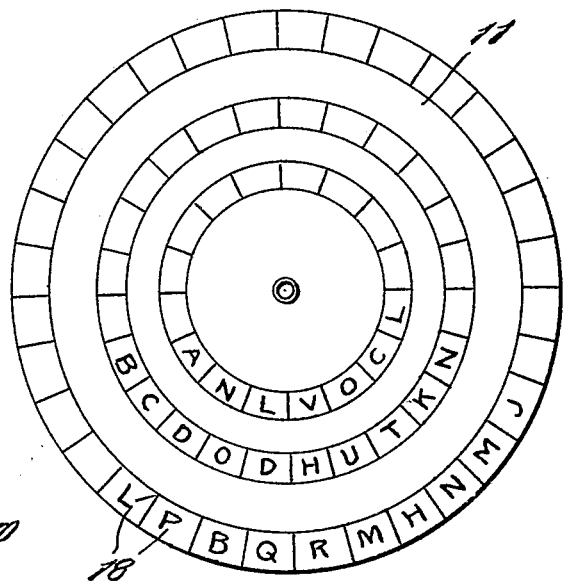
Fig. 7.
Fig. 8.
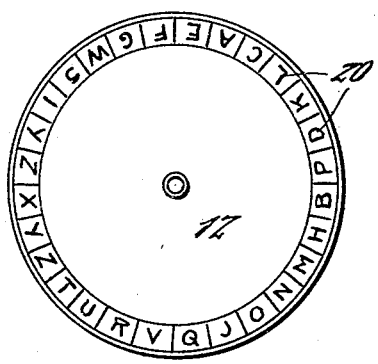
Inventor
F. O. Phagans
By Clarence A. O'Brien
Attorney Patented Oct. 27, 1931

1,829,295

UNITED STATES PATENT OFFICE

FLOYD OTIS PHAGANS, OF RYAN, OKLAHOMA

DEVICE FOR TEACHING ARITHMETIC

Application filed August 27, 1929. Serial No. 388,740.

This invention relates to certain new and useful improvements in devices especially adapted for teachers in teaching arithmetic to beginners.

The primary object of the invention is in the provision of a portable and handy device especially applicable for use in teaching young children the intricacies of arithmetic, such as the addition, subtraction, multiplication, and division.

A further object of the invention is to provide a device of this character, wherein simple and easy problems in arithmetic are presented, together with the correct answer to the problem, the device further embodying means whereby the beginner may readily ascertain whether or not he has the correct answer to the problem.

A still further object of the invention is to provide a device of this character, which is simple in construction, capable of easy operation, absolutely accurate, efficient, strong and durable, thoroughly reliable in use, consisting of but few parts, rendering the device capable of being easily and readily assembled and otherwise well adapted for the purpose designed.

Other objects and advantages of the invention will become apparent during a study of the following description, taken in connection with the accompanying drawings, wherein:

Figure 2 is a rear elevation of the same.

Figure 4 is an end elevation of the device.

Figure 5 is a front elevation of the sums carrying disc.

Figure 6 is a similar view of the problem carrying disc.

Figure 7 is a rear elevation of the problem carrying disc.

Figure 8 is a rear elevation of the sum carrying disc.

Figure 1:
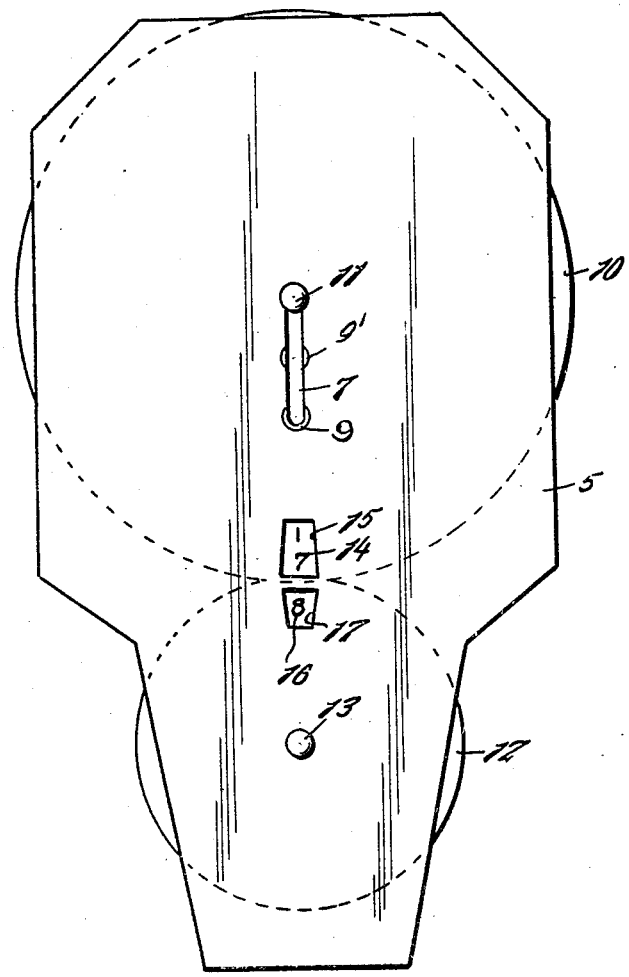
Figure 1 is a front elevation of the device.
Figure 3:
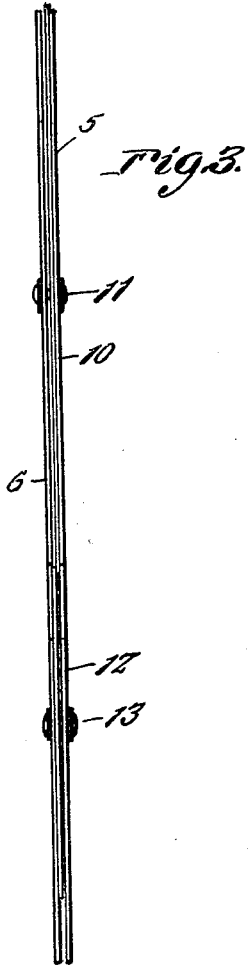
Figure 3 is an edge elevation.
Figure 9:
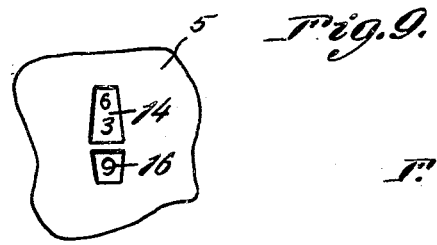
Figure 9 is a fragmentary detail view for the purpose of better illustrating the operation of the device.

With reference more in detail to the drawings, it will be seen that the invention comprises a pair of parallel plates, which, for the sake of clarity may be designated as the front plate 5 and the rear plate 6.

With but a few exceptions to be herein noted, the plates are of substantially identical construction. Thus the plates are of somewhat elongated construction having a decided taper at one end. Formed in the plates are the registered longitudinally extending slots 7 and 8 respectively, adapted to register one with the other. The plate 5 is provided at the upper and lower ends of the slots 7 with somewhat circular depressions forming end seats 9, while intermediate the ends, and on opposite sides of the slots the plate is further depressed in a somewhat arcuate manner to provide an intermediate seat 9'. Slidably and rotatably mounted between the opposed enlarged portions of the plate is a relatively large problem frame disc 10. Extending through the disc 10 and having its opposite ends slidable in the respective slots 7 and 8 is a suitable pin 11, adapted to be selectively seated in the seats 9 and 9'. Obviously, by sliding the pin 11 longitudinally in the slot, the disc 10 will be slid longitudinally between the plates. Disposed between the smaller opposed end portions of the plate is a rotatable sum carrying disc 12. This disc 12 is adapted for rotation only. The disc 12 is pivoted between the plates as at 13 and the upper marginal edges of the disc 12 is adapted to be disposed in overlapping relation with the adjacent marginal edge portion of the relatively larger disc 10. The relatively larger disc 10 on the front face thereof is provided with a plurality of radially disposed columns of numbers designated generally by the reference character 14. As shown the columns of numbers are preferably arranged in circular rows, there being three of such rows, an outer row, an intermediate row, and an inner row. The columns of numbers 14 are adapted, upon rotation of the disc to register with a suitable sight opening 15, formed in the front plate 5, in spaced relation to one end of the slot 7 and in longitudinal alignment with the slot. Obviously any predetermined column of numbers may be brought into registry with the sight opening as desired by the operator and through the rotation of the disc 10. Likewise, the respective rows may be so positioned as to have their columns so register with the sight openings 15 by placing the pin 11 in any predetermined seat. In other words, if the pin 11 is in a seat 9, at the upper end of the slot 7, obviously upon rotation of the disc 10, the columns in the outer row will register with the sight opening. To place the head of pin 11 in any one of the seats, all that is necessary is to merely exert pressure with the thumb of the hand against the head of the pin for urging the pin transversely through the slots in the plates so that the marginal edge of the head of the pin will be moved into the depression forming the seat.

Likewise on its outer face, the relatively small disc 12 is provided, adjacent its periphery, with a circular row of numbers 16. Each of the numbers 16 represents a sum of a predetermined number of figures 14. Thus the numbers 16 may be hereinafter referred to as the sum. On the front face 5, there is provided, directly beneath the sight opening 15, and in alignment therewith, a relatively smaller sight opening 17, with which any predetermined sum 16 is adapted to register upon rotation of the disc 12 as is obvious. Thus, it will be seen that if it is desired to present a certain problem in the sight opening 15, the disc 10 is rotated, so that the column bearing that problem will be brought into registry with the sight opening 15. As shown in Figure 1, that column bearing the numbers 7 and 1 is the desired problem and it is for the pupil to determine which number 16 on the disc 12, represents the sum of the numbers 7 and 8, whereupon the disc 12 will be rotated, in order to bring that certain number 16, which the pupil intends to represent the sum of the problem in registry with the sight opening 17, and in this case the sum of the problem being 8, the disc is rotated, so that the numeral 8 is brought into registry with the sight opening 17.

In order for the pupil to ascertain whether or not the sum 8 is the correct answer to the problem, there is provided, a plurality of radially disposed indicating symbols indicated generally by the reference character 18. These symbols 18 are arranged in circular rows, somewhat similar to the rows of the column 14, there being one symbol for each of the columns 14, to designate that particular column.

Consequently the rear face 6 is provided with a sight opening 19, which opening 19 is substantially in alignment with the sight opening 15. Thus it will be seen that when the predetermined problem or column 14 is brought into registry with the sight opening 15, the symbol indicating that column will simultaneously be brought into registry with the sight opening 19. Likewise, for each of the numbers or sum 16 on the disc 12, the disc is provided on its opposite face with a plurality of circularly arranged sum indicating symbols 20. There is one symbol for each of the sums 16. Adjacent its lower end, the rear plate 6 is provided with a sight opening 21, so that manifestly when any predetermined sum 16 is brought into registry with the sight opening 17, the symbol denoting that specific sum will be brought into registry with the sight opening 21. In order that the pupil may determine whether or not the sum chosen is the correct sum or answer to the problem, the symbol 20 of the sum will correspond with the symbol of the column or problem to which the sum designated by the symbol 20 is the correct sum or answer to that specific problem.

In other words, and as clearly shown in Figures 1 and 2, if the symbol indicating the problem bearing the columns 1 and 7 is the letter R, then the correct sum or answer to the problem which is the numeral 8 will have as its symbol the letter R also, so that consequently, if the correct sum or answer to the problem is brought into registry with the sight opening 17, the symbol of that sum registering with the sight opening 21 will correspond with the symbol disposed to view through the sight opening 19.

It is believed that from a study of the foregoing description, taken in connection with the accompanying drawings, a clear understanding of the operation of the device will be had, and it is to be understood that although I have shown the device as being applicable for teaching addition, it is obvious that the same method utilized herein for presenting problems and their correct answers may be also used for teaching subtraction, division, multiplication and similar forms of arithmetic.

Even though I have herein shown and described the preferred embodiment of my invention, it is to be understood that the same is susceptible to changes fully comprehended by the spirit of the invention, as herein described, and the scope of the appended claims.

What is claimed is:

1. In a device of the class described, an elongated plate, a relatively large disc rotatable and slidable on the plate adjacent one end of the plate, a relatively smaller disc rotatable on the plate adjacent the other end of the plate, the first mentioned disc having a plurality of columns of numbers radially disposed thereon, the columns being arranged in annular rows, the second mentioned disc having the total of the respective columns arranged thereon in a circular manner, said plate being provided with a pair of sight openings, said first mentioned disc being adapted for rotation for selectively displaying to view, through one of said openings, a predetermined column of numbers on said disc and by sliding the disc a column in any one of the rows can be brought opposite the window or opening, and said second mentioned disc adapted to be rotated for selectively displaying certain of the totals thereon to view, through the other of said openings, and identifying means on the respective discs for indicating whether or not the number displayed is the total for the column of numbers displayed through the first mentioned opening.

2. An educational device comprising a rotatable disc having a plurality of columns of numbers radially disposed thereon, said columns being arranged in annular rows, a second rotatable disc having the total of the respective columns arranged thereon, said first mentioned disc having radially disposed thereon respective differing identifying symbols for each of said columns, said second disc having arranged thereon an identifying symbol for each of the totals corresponding to the identifying symbol of a predetermined column of the first disc, whereby the total of any one of the columns may be ascertained, a cover member arranged in front of the discs and having windows therein, one of which will expose a column of numbers on the first disc and the other of which will expose a symbol on the other disc, said first disc being slidable towards and away from the second disc to bring any one of the rows of columns to a position to expose one of the columns in said row through the column exposing window.

In testimony whereof I affix my signature.

FLOYD OTIS PHAGANS.